US012686897B2

(12) United States Patent
Sano et al.

(10) Patent No.: US 12,686,897 B2
(45) Date of Patent: Jul. 21, 2026

(54) HEAT TREATMENT METHOD FOR AMORPHOUS ALLOY RIBBON AND HEAT TREATMENT APPARATUS FOR AMORPHOUS ALLOY RIBBON

(71) Applicant: Proterial, Ltd., Tokyo (JP)

(72) Inventors: Hirohisa Sano, Tokyo (JP); Takeshi Fukuyama, Tokyo (JP)

(73) Assignee: Proterial, Ltd., Tokyo (JP)

( * ) Notice: Subject to any disclaimer, the term of this patent is extended or adjusted under 35 U.S.C. 154(b) by 467 days.

(21) Appl. No.: 18/027,924

(22) PCT Filed: Sep. 22, 2021

(86) PCT No.: PCT/JP2021/034822
§ 371 (c)(1),
(2) Date: Mar. 23, 2023

(87) PCT Pub. No.: WO2022/065370
PCT Pub. Date: Mar. 31, 2022

(65) Prior Publication Data

US 2023/0366054 A1 Nov. 16, 2023

(30) Foreign Application Priority Data

Sep. 25, 2020 (JP) ................................ 2020-160807

(51) Int. Cl.
*C21D 9/00* (2006.01)
*C22C 45/00* (2023.01)
*H01F 1/153* (2006.01)

(52) U.S. Cl.
CPC ......... *C21D 9/0068* (2013.01); *C21D 9/0012* (2013.01); *C22C 45/008* (2013.01);
(Continued)

(58) Field of Classification Search
CPC .................................................... C21D 9/0068
See application file for complete search history.

(56) References Cited

U.S. PATENT DOCUMENTS 4,288,260 A * 9/1981 Senno ...................... C21D 9/56 148/120
5,069,428 A 12/1991 Li et al.
(Continued)

FOREIGN PATENT DOCUMENTS

CN 101935812 1/2011
CN 106270425 1/2017
(Continued)

OTHER PUBLICATIONS

"International Search Report (Form PCT/ISA/210) of PCT/JP2021/034822", mailed on Nov. 30, 2021, with English translation thereof, pp. 1-6.

(Continued)

*Primary Examiner* — Alexandra M Moore
(74) *Attorney, Agent, or Firm* — JCIPRNET

(57) ABSTRACT

The present invention provides a heat treatment method and a heat treatment apparatus for an amorphous alloy ribbon, said method and apparatus being capable of uniformly heat treating an amorphous alloy ribbon, while suppressing the occurrence of anisotropy in the magnetic characteristics. A heat treatment method for an amorphous alloy ribbon, said method comprising a step wherein an amorphous alloy ribbon is transferred, while being in contact with a heated projected surface, and the amorphous alloy ribbon is transferred, while having the part that is in contact with the projected surface pressed against the projected surface from a surface which is on the reverse side of the surface that is in contact with the projected surface.

6 Claims, 6 Drawing Sheets

(52) U.S. Cl.
CPC ..... *H01F 1/15341* (2013.01); *C22C 2200/04* (2013.01); *C22C 2202/02* (2013.01)

(56) References Cited

U.S. PATENT DOCUMENTS

| | | | | |
|---|---|---|---|---|
| 6,425,960 B1 * | 7/2002 | Yoshizawa | C22C 45/02 | 148/306 |
| 2013/0139929 A1 * | 6/2013 | Francoeur | C21D 9/56 | 148/403 |

FOREIGN PATENT DOCUMENTS

| | | | | |
|---|---|---|---|---|
| GB | 737424 | | 9/1955 | |
| GB | 737424 A | * | 9/1955 | H05B 6/788 |
| JP | S5483622 | | 7/1979 | |
| JP | 2013511617 | | 4/2013 | |
| JP | 2016145373 | | 8/2016 | |
| JP | 2018081998 | | 5/2018 | |
| KR | 1020140059487 | | 5/2014 | |
| WO | 2011060546 | | 5/2011 | |
| WO | 2017150440 | | 9/2017 | |

OTHER PUBLICATIONS

"Search Report of Europe Counterpart Application", issued on Sep. 13, 2024, p. 1-p. 8.
"Office Action of China Counterpart Application", issued on Jul. 7, 2025, with English translation thereof, p. 1-p. 13.
"The Second Office Action of China Counterpart Application", issued on Dec. 12, 2025, with English translation thereof, pp. 1-13.

* cited by examiner

HEAT TREATMENT METHOD FOR AMORPHOUS ALLOY RIBBON AND HEAT TREATMENT APPARATUS FOR AMORPHOUS ALLOY RIBBON

CROSS-REFERENCE TO RELATED APPLICATION

This application is a 371 application of an international PCT application serial no. PCT/JP2021/034822, filed on Sep. 22, 2021, which claims the priority benefit of Japan application JP2020-160807, filed on Sep. 25, 2020. The entirety of each of the above-mentioned patent applications is hereby incorporated by reference herein and made a part of this specification.

TECHNICAL FIELD

The present invention relates to a heat treatment method for an amorphous alloy ribbon and a heat treatment apparatus for an amorphous alloy ribbon.

BACKGROUND ART

As a method for adjusting characteristics of an amorphous alloy ribbon, a treatment of applying heat by transferring an amorphous alloy ribbon that is brought into contact with a heated projected surface is known. Specifically, a heat treatment method in which an amorphous alloy ribbon that is brought into contact with a heated surface of a roller is transferred while being mechanically constrained, and rapidly heated and cooled is known (for example, Patent Literature 1).

CITATION LIST

Patent Literature

Patent Literature 1

WO2011/060546

SUMMARY OF INVENTION

Technical Problem

According to the method described in Patent Literature 1, for example, a heat treatment can be performed while minimizing embrittlement. However, in order to secure sufficient contact with a surface of a roller, it is necessary to apply high tension to a ribbon. In addition, the surface of the ribbon is not necessarily flat, and a certain amount of undulation remains in some cases, which increases the tension required to bring the entire surface of the ribbon into full contact with the roller. In this case, there is a concern that the anisotropy of magnetic characteristics may become too strong depending on the direction of the ribbon. Ribbons with high anisotropy in magnetic characteristics have limited applications. In addition, there is a limit to the tension that can be applied to the ribbon in order to secure sufficient contact between the ribbon and the roller, and there is a risk of a heat treatment becoming inconsistent due to an inconsistent contact state between the ribbon and the roller.

Here, the present invention provides a heat treatment method for an amorphous alloy ribbon and a heat treatment apparatus through which it is possible to uniformly heat an amorphous alloy ribbon while minimizing the occurrence of anisotropy in magnetic characteristics.

Solution to Problem

The present invention provides a heat treatment method for an amorphous alloy ribbon including a step of transferring an amorphous alloy ribbon that is brought into contact with a heated projected surface and performing transferring while a part of the amorphous alloy ribbon in contact with the projected surface is pressed against the projected surface from the side opposite to the contact surface.

In addition, preferably, the step is performed a plurality of times by changing the surface of the amorphous alloy ribbon with which the projected surface comes in contact.

In addition, preferably, the contacting part of the amorphous alloy ribbon is pressed via a flexible member.

In addition, preferably, the flexible member is pressed while heating.

In addition, preferably, the flexible member is a metal member.

In addition, preferably, the amorphous alloy ribbon is a nanocrystalline soft magnetic material.

The present invention provides a heat treatment apparatus for an amorphous alloy ribbon including a combination of a heating part having a projected surface with which an amorphous alloy ribbon is brought into contact and for heating, and a pressing part that presses a contacting part of the amorphous alloy ribbon against the projected surface from the side opposite to the contact surface.

In addition, preferably, the heat treatment apparatus has a plurality of combinations thereof in a traveling direction of the amorphous alloy ribbon, and the positional relationship between the heating part and the pressing part with respect to the amorphous alloy ribbon is reversed in adjacent combinations.

In addition, preferably, the pressing part is a flexible member.

In addition, preferably, the pressing part is a band member that is transferable via rollers.

In addition, preferably, the band member is a metal member.

In addition, preferably, the roller has a heating mechanism for heating the band member.

Advantageous Effects of Invention

According to the present invention, it is possible to produce an amorphous alloy ribbon in which it is possible to perform a heat treatment while securing sufficient thermal contact without applying much tension to the amorphous alloy ribbon, and the occurrence of anisotropy in magnetic characteristics is minimized.

DESCRIPTION OF EMBODIMENTS

First Embodiment

Hereinafter, one embodiment of the present invention will be described in detail with reference to the drawings.

In a heat treatment apparatus of in the present embodiment, an amorphous alloy ribbon that is brought into contact with a heated projected surface is transferred. One feature of such a heat treatment apparatus is that it has a pressing part that presses a contacting part of the amorphous alloy ribbon against the projected surface from the side opposite to the contact surface. The form of pressing the amorphous alloy ribbon is not particularly limited, but it is preferable to press via a flexible member that corresponds to the shape of the heated projected surface. Here, "contact surface" means the surface of the amorphous alloy ribbon which comes into contact with the projected surface.

Figure 1:
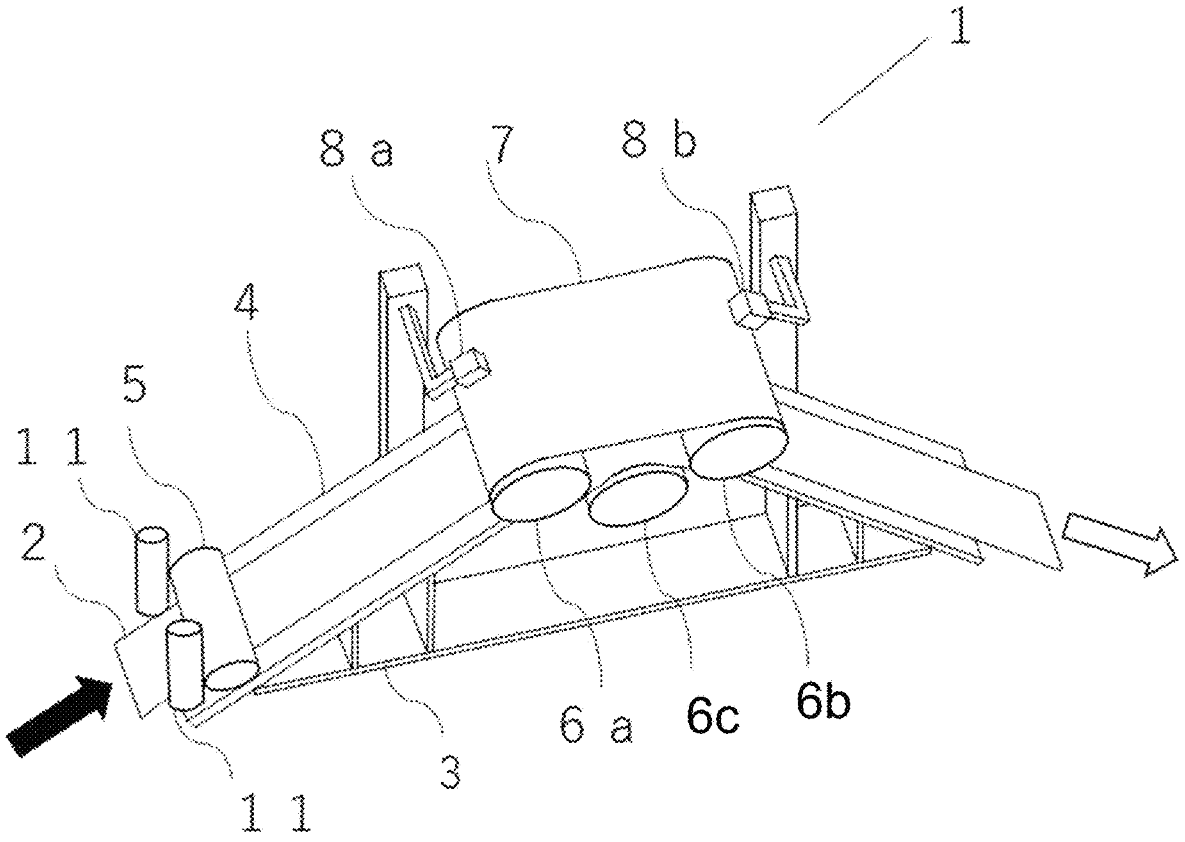
FIG. 1 is a conceptual perspective view of a heat treatment machine for an amorphous alloy ribbon, which is a first embodiment of the present invention.

FIG. 1 is a conceptual perspective view of a heat treatment apparatus 1 for an amorphous alloy ribbon used for a heat treatment in the present embodiment. The heat treatment apparatus 1 includes a ribbon guide slope 4 installed on a base 3, a brake roller for ribbon tension 5, a ribbon width direction regulation mechanism 11, heating rollers 6*a*, 6*b*, and 6*c*, a ribbon pressing metal belt 7, and thermocouples 8*a*, 8*b*, and 8*c* (not shown in FIG. 1), and an amorphous alloy ribbon 2 can be arranged between the heating roller 6*c* and the ribbon pressing metal belt 7. The ribbon pressing metal belt 7 is an example of a flexible member, and is a band member that can be transferred via rollers. The flexible member (band member) is preferably a metal member in consideration of flexibility, strength, and heat resistance.

Here, the heating roller 6*c* is a roller that is in direct contact with an amorphous alloy ribbon and is used for heating. The amorphous alloy ribbon 2 abuts on (contacts) a part of the outer circumferential surface of the columnar heating roller 6*c* (a partial area in the circumferential direction) and is heated. Here, the roller 6*c* itself does not have a drive source, and is driven by the ribbon pressing metal belt 7 and thus it can be operated synchronously without a complicated mechanism.

The rollers for driving the ribbon pressing metal belt 7 may be both the heating roller 6*a* and the heating roller 6*b* or either of them. In the present embodiment, a driving force is applied to the heating roller 6*b*, and the heating roller 6*a* is mechanically dependent. Accordingly, it is possible to avoid complex control such as an electrical synchronous operation for the heating roller 6*a* and the heating roller 6*b*, and additionally, there is no need to correct synchronous deviation due to the difference in thermal expansion between the heating roller 6*a* and the heating roller 6*b*.

The ribbon pressing metal belt 7 presses the amorphous alloy ribbon 2 against the heating roller 6*c*. That is, the ribbon pressing metal belt 7 presses the amorphous alloy ribbon 2 against the projected surface of the heating roller 6*c* (the curved surface of the outer circumference) from the side opposite to the contact surface. That is, the heating roller 6*a*, the heating roller 6*b*, and the ribbon pressing metal belt 7 constitute a pressing part in the heat treatment apparatus 1.

Here, the heating roller 6*c* is an example of a heating part having a projected surface with which an amorphous alloy ribbon is brought into contact and for heating. In addition, the "projected surface" means a surface that rises toward the side of the amorphous ribbon, and as shown in the roller in FIG. 1, in addition to a curved side surface of a columnar (cylindrical) shape, any shape in which the amorphous ribbon conforms to secure sufficient contact, such as a curved surface that is formed in a part of the member, like a curved surface of a semi-cylindrical member, may be used.

The material of the amorphous alloy ribbon 2 is not particularly limited. For example, Fe-based amorphous alloys such as Fe—Si—B-based and Fe—Si—B—C-based alloys, and Fe-based nanocrystalline alloys such as Fe—Si—B—Nb—Cu-based alloys and Fe—Si—B—Nb—Cu—Ni-based alloys which are nanocrystalline soft magnetic materials can be applied. The Fe-based nanocrystalline alloy has a composition in which nanocrystals are crystallized by heating an amorphous alloy ribbon.

The rollers constituting the pressing part in the heat treatment apparatus 1 do not necessarily need to be heated as long as they drive the ribbon pressing metal belt 7 and the ribbon pressing metal belt 7 has a function of pressing the amorphous alloy ribbon 2 against the heating roller 6*c*. However, in the heat treatment for the amorphous alloy ribbon, since it is necessary to heat the amorphous alloy ribbon to, for example, 500° C., heat loss due to radiation increases at a high temperature. Particularly, since the ribbon pressing metal belt 7 having a small volume has a small amount of heat storage, the temperature drops quickly. Here, when a heating roller having a heating mechanism is used as the roller constituting the pressing part, heat can be supplied continuously, and the temperature stability of the ribbon press metal belt is improved. When a ribbon is interposed between the ribbon press metal belt and the roller kept at a high temperature from both surfaces, the rate of heat supply to the ribbon is improved, a rapid temperature rise of the ribbon is possible, and stability of the heat treatment temperature can be expected.

When the amorphous alloy ribbon 2 is an Fe-based amorphous alloy or the like, the heating temperature of each of the heating rollers 6*a*, 6*b*, and 6*c* is preferably 350° C. or higher and 400° C. or lower, and when the amorphous alloy ribbon 2 is an Fe-based nanocrystalline alloy or the like, the heating temperature of each of the heating rollers 6*a*, 6*b*, and 6*c* is preferably 500° C. or higher.

The material of the ribbon pressing metal belt 7 is not particularly limited. For example, it is more preferable to use a material having excellent heat resistance such as heat-resistant stainless steel or a nickel-based super heat-resistant alloy.

The tension roller 5 and the ribbon width direction regulation mechanism 11 are used as a set in order to prevent meandering of the ribbon. When the ribbon width direction regulation 11 operates so that the ribbon in front of the tension roller 5 does not shift laterally, the ribbon enters the center of the tension roller 5, and in contrast, the position between the heating roller 6*c* and the belt shifts laterally (meanders), the tension of the tension roller 5 generates a force to return to the center, and meandering is minimized.

Next, the heat treatment method according to the present embodiment will be sequentially described with reference to FIG. 2 ((a) to (f)) showing the cross section of the heat treatment apparatus 1. In the heat treatment method in the present embodiment, an amorphous alloy ribbon that is brought into contact with a heated projected surface is transferred. In this case, the contacting part of the amorphous alloy ribbon is transferred while being pressed against the projected surface from the side opposite to the contact surface.

Figure 2:
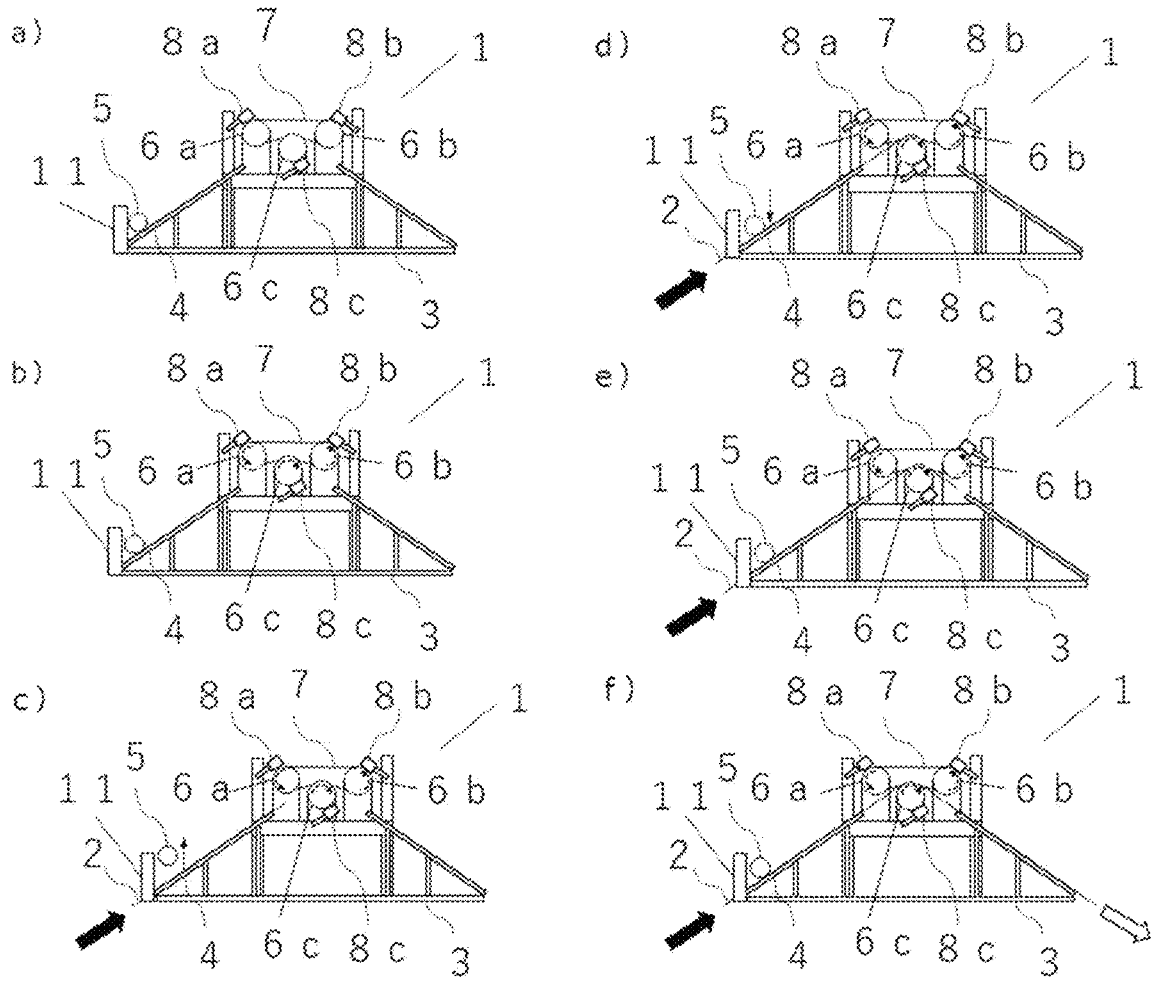
FIG. 2 shows schematic views sequentially showing procedures ((a) to (f)) of a heat treatment method for an amorphous alloy ribbon in the first embodiment of the present invention.

First, the ribbon pressing metal belt 7 is laid over the heating roller 6*a* and the heating roller 6*b*, and the heating roller 6*c* is arranged so that it comes into contact with the ribbon pressing metal belt 7 from the outside, and applies tension (FIG. 2(*a*)). The ribbon pressing metal belt 7 is configured to be transferable via the heating roller 6*a* and the heating roller 6*b*.

While rotating the heating rollers 6*a*, 6*b*, and 6*c* in directions of arrows indicated by dashed lines, the heating rollers 6*a* and 6*b* are heated to, for example, 550° C., and the heating roller 6*c* is heated to, for example, 500° C. In this case, the temperatures of the heating rollers 6*a*, 6*b*, and 6*c* and the ribbon pressing metal belt 7 are measured and controlled by the thermocouples 8*a*, 8*b*, and 8*c* (FIG. 2(*b*)).

With the brake roller for ribbon tension 5 that is raised in the thin arrow direction in the drawing, the amorphous alloy ribbon 2 sent out from a ribbon unwinding machine (not shown) is supplied in the black arrow direction in the drawing along the ribbon guide slope 4 (FIG. 2(*c*)). The roller for ribbon tension 5 and the ribbon width direction regulation mechanism 11 for minimizing meandering of the ribbon are installed at the entrance of the ribbon guide slope 4. A small amount of tension at which meandering is prevented is applied to the roller for ribbon tension 5, but if the ribbon is interposed between the metal belt 7 and the heating roller 6*c* in order to perform a heat treatment, since a friction force from the clamp near the entrance offsets the tension, no tension is applied to the ribbon in the subsequent heat treatment section.

When the inclined ribbon guide slope 4 is used in front of and behind (both sides) the heating roller 6*c*, the amorphous alloy ribbon 2 that is in contact with both the ribbon pressing metal belt 7 and the heating roller 6*c* can be discharged. That is, when the tilt angle of the ribbon guide slope 4 is adjusted and the supply/discharge angle of the amorphous alloy ribbon 2 is set, it is possible to heat and cool the front and back sides of the amorphous alloy ribbon 2 at the same time. It is more preferable to perform arrangement so that the tangent line of the heating roller 6*c* matches the extension line of the ribbon guide slope.

When the amorphous alloy ribbon 2 is interposed between the ribbon pressing metal belt 7 and the heating roller 6*c*, automatic winding of the ribbon starts. Here, the brake roller for ribbon tension 5 is set (FIG. 2(*d*)).

The amorphous alloy ribbon 2 that is in contact with the projected surface of the heating roller 6*c* is transferred, and the ribbon pressing metal belt 7 allows the contacting part of the amorphous alloy ribbon that is pressed against the projected surface of the heating roller 6*c* from the side opposite to the contact surface to be transferred (FIG. 2(*e*)).

Although the speed of the ribbon pressing metal belt 7 and the speed of the amorphous alloy ribbon 2 are different, and slippage may occur, it is preferable that the ribbon pressing metal belt 7 and the amorphous alloy ribbon 2 be transferred together.

The amorphous alloy ribbon 2, which has passed between the pressing part composed of the ribbon pressing metal belt 7 and the heating rollers 6*a* and 6*b* and the heating roller 6*c*, is discharged in the white arrow direction in the drawing along the ribbon guide slope 4 (FIG. 2(*f*)). The discharged amorphous alloy ribbon 2 is wound by a ribbon winding machine (not shown).

Second Embodiment

Next, a second embodiment of the present invention will be described in detail with reference to the drawings. Here, a heat treatment apparatus for an amorphous alloy ribbon according to the present embodiment differs from a heat treatment apparatus for an amorphous alloy ribbon according to a first embodiment only in the pressing part and the heating part, which are composed of the heating roller and the ribbon pressing metal belt, and an enlarged schematic view of that part will be used for explanation. In addition, since the same configurations as in the first embodiment have the same operational effects, they will be denoted with the same reference numerals and descriptions thereof will be omitted.

Figure 3:
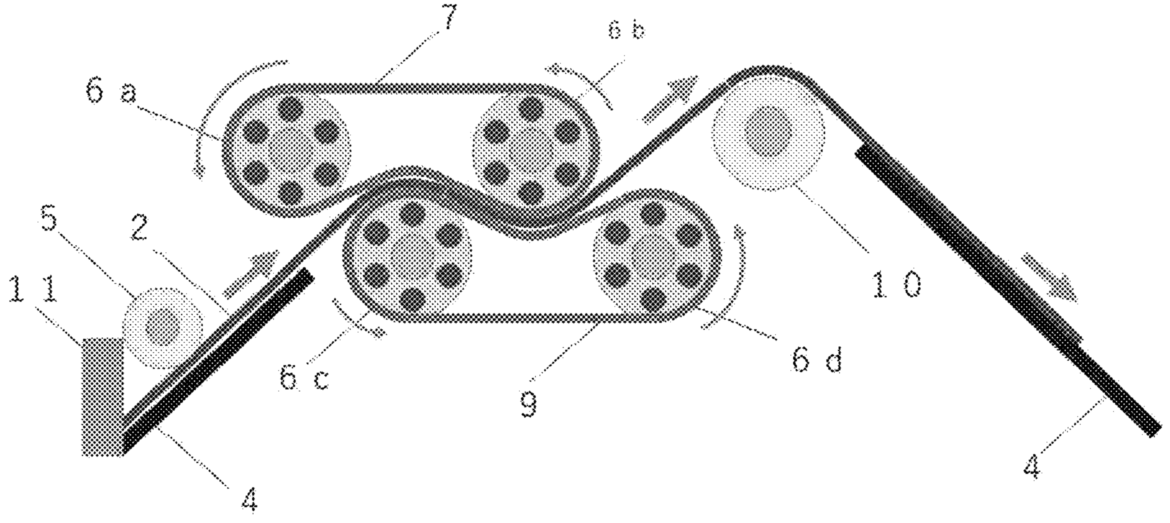
FIG. 3 is an enlarged schematic view of a pressing part and a heating part in a second embodiment of the present invention.

FIG. 3 is an enlarged schematic view of the pressing part and the heating part in the heat treatment apparatus for an amorphous alloy ribbon according to the second embodiment. As shown in FIG. 3, the heat treatment part includes the heating rollers 6*a*, 6*b*, 6*c*, and 6*d*, the ribbon pressing metal belts 7 and 9, and a guide roller 10, and the amorphous alloy ribbon 2 can be arranged between the ribbon pressing metal belts 7 and 9.

That is, when viewed from the traveling direction of the amorphous alloy ribbon 2, the plurality of heating rollers 6*a*, 6*b*, 6*c*, and 6*d* are arranged so that they overlap unevenly and partially. The heating rollers 6*a* and 6*b* for heating one surface of the amorphous alloy ribbon 2 and the heating rollers 6*c* and 6*d* for heating the other surface are alternately arranged, a first band member (the ribbon pressing metal belt 7) is wound around the heating rollers 6*a* and 6*b* for heating one surface, and a second band member (the ribbon pressing metal belt 9) is wound around the rollers 6*c* and 6*d* for heating the other surface. In the part of the heating rollers 6*a* and 6*b* around which the first band member (the ribbon pressing metal belt 7) is wound, the first band member becomes a part of the heating part for one surface of the amorphous alloy ribbon 2, and the second band member (the ribbon pressing metal belt 9) becomes a pressing part. Here, in the part of the heating rollers 6*c* and 6*d* around which the second band member (the ribbon pressing metal belt 9) is wound, the second band member becomes a part of the heating part for the other surface of the amorphous alloy ribbon 2, and the first band member (the ribbon pressing metal belt 7) becomes a pressing part.

Like the ribbon pressing metal belt 7, the ribbon pressing metal belt 9 is an example of a flexible member and is a band member that can be transferred via rollers. The flexible member (band member) is preferably a metal member in consideration of flexibility, strength, and heat resistance.

The ribbon pressing metal belt 7 presses the amorphous alloy ribbon 2 against the ribbon pressing metal belt 9 conforming to the projected surface (a curved surface of the outer circumference) of the heating roller 6*c*. That is, the ribbon pressing metal belt 7 presses the amorphous alloy ribbon 2 against the ribbon pressing metal belt 9 from the side opposite to the contact surface conforming to the projected surface (a curved surface of the outer circumference) of the heating roller 6*c*. Similarly, the ribbon pressing metal belt 9 presses the amorphous alloy ribbon 2 against the ribbon pressing metal belt 7 from the side opposite to the contact surface conforming to the projected surface (a curved surface of the outer circumference) of the heating roller 6*b*.

That is, in the present embodiment, the heating roller 6*a*, the heating roller 6*b*, the ribbon pressing metal belt 7, the heating roller 6*c*, the heating roller 6*d*, and the ribbon pressing metal belt 9 each constitute a pressing part in the heat treatment apparatus 1 and a heating part in the heat treatment apparatus 1 at the same time.

Here, when only one of the heating rollers 6*a*, 6*b*, 6*c*, and 6*d* is driven and the other rollers are driven via the ribbon pressing metal belts 7 and 9, a synchronous operation can be performed without a complicated mechanism. In the present embodiment, a driving force is applied to the heating roller 6*b*, and the heating rollers 6*a*, 6*c*, and 6*d* are mechanically dependent via the ribbon pressing metal belts 7 and 9. Accordingly, it is possible to avoid complex control such as an electrical synchronous operation for the heating rollers 6*a*, 6*b*, 6*c*, and 6*d*, and additionally, there is no need to correct synchronous deviation due to the difference in thermal expansion between the heating rollers 6*a*, 6*b*, 6*c*, and 6*d*.

Next, the heat treatment method according to the present embodiment will be described with reference to FIG. 3, which is an enlarged schematic view of the heat treatment part in the heat treatment apparatus for an amorphous alloy ribbon according to the second embodiment.

When the amorphous alloy ribbon 2 supplied along the ribbon guide slope 4 is interposed between the ribbon pressing metal belt 7 and the ribbon pressing metal belt 9, automatic winding of the ribbon starts.

The amorphous alloy ribbon 2 that is in contact with the ribbon pressing metal belt 9 conforming to the projected surface (a curved surface of the outer circumference) of the heating roller 6*c* is transferred, and the ribbon pressing metal belt 7 allows the contacting part of the amorphous alloy ribbon that is pressed against the ribbon pressing metal belt 9 conforming to the projected surface (a curved surface of the outer circumference) of the heating roller 6*c* from the side opposite to the contact surface to be transferred.

Next, the amorphous alloy ribbon 2 that is in contact with the ribbon pressing metal belt 7 conforming to the projected surface (a curved surface of the outer circumference) of the heating roller 6*b* is transferred, and the ribbon pressing metal belt 9 allows the contacting part of the amorphous alloy ribbon that is pressed against the ribbon pressing metal belt 7 conforming to the projected surface (a curved surface of the outer circumference) of the heating roller 6*b* from the side opposite to the contact surface to be transferred.

Although the speed of the ribbon pressing metal belt 7 and the ribbon pressing metal belt 9 and the speed of the amorphous alloy ribbon 2 are different and slippage may occur, it is preferable that the ribbon pressing metal belt 7, the ribbon pressing metal belt 9, and the amorphous alloy ribbon 2 be transferred together.

The amorphous alloy ribbon 2, which has passed through the ribbon pressing metal belts 7 and 9, is discharged in the white arrow direction in the drawing along the guide roller 10. The discharged amorphous alloy ribbon 2 is transferred along the ribbon guide slope 4 and wound by a ribbon winding machine (not shown).

When the amorphous alloy ribbon is used, for example, in a motor stator core, it is necessary to use a straight ribbon. As shown in the first embodiment, when a treatment is performed in contact with the projected surface only in the one direction, since bending occurs in the curvature direction of the projected surface, in order to correct the bending, the front and back of the ribbon should be reversed, and the heat treatment should be performed again. However, as in the present embodiment, if the amorphous alloy ribbon is sequentially brought into contact with the projected surface facing different directions, it is possible to correct bending caused in the curvature direction of the projected surface without changing the front and back of the ribbon, and it is possible to efficiently obtain a heat treatment ribbon with less bending.

EXAMPLES

Hereinafter, examples will be described.

An amorphous alloy ribbon 2 formed of an Fe-based amorphous alloy with a width of 60 mm and a thickness of 24.8 μm formed by a single roller method was prepared.

Example 1

First, using the first embodiment, without applying tension to the amorphous alloy ribbon 2, while the amorphous alloy ribbon 2 was transferred at a rate of 200 mm/s, both surfaces of the ribbon were heated at 520° C., and thereby Example 1 was produced.

Figure 4:
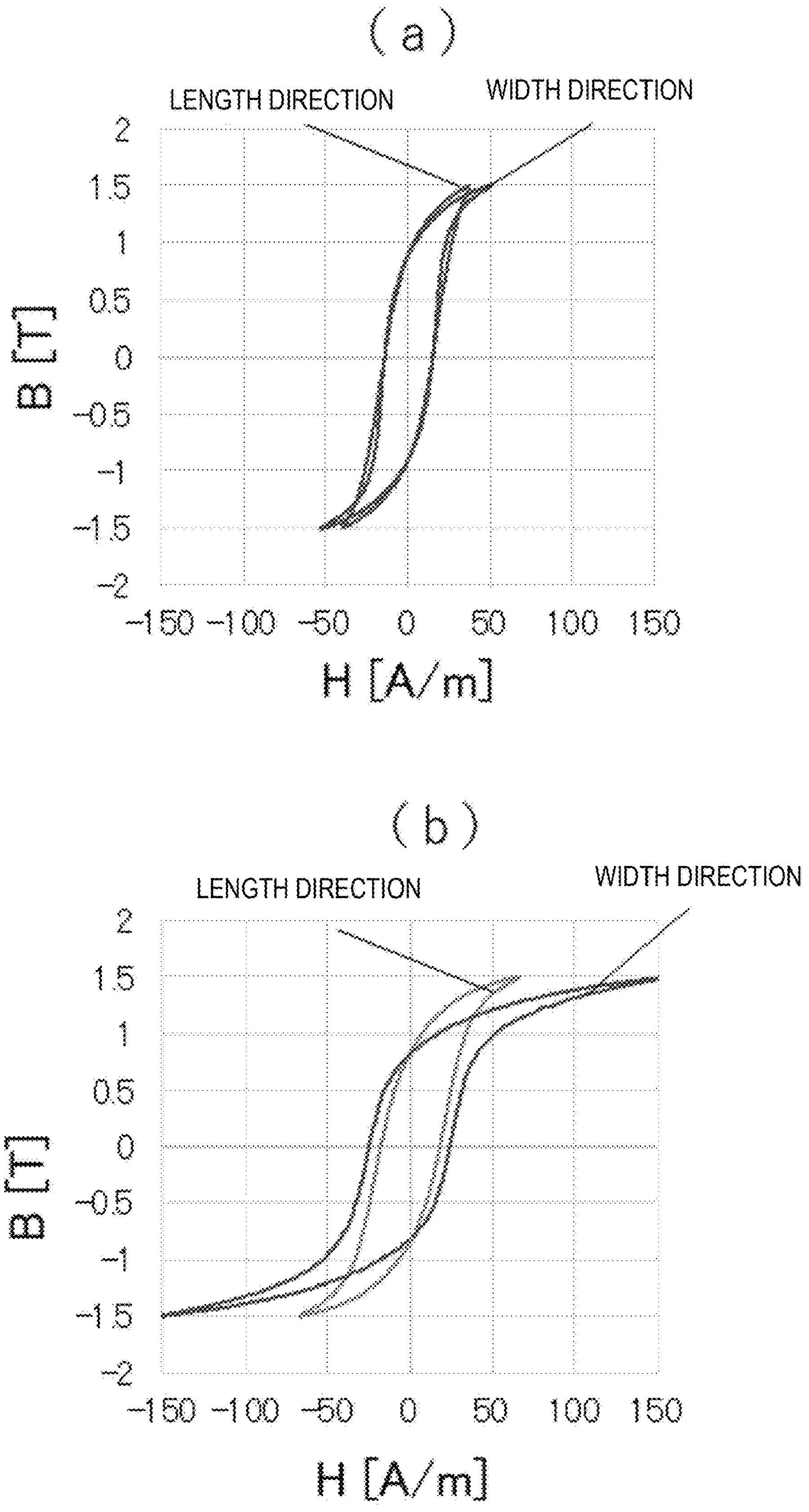
FIG. 4 shows graphs of magnetic characteristics in Example 1 and Comparative Example 1 in the first embodiment of the present invention.

Then, a magnetization curve (B-H curve) of the heated amorphous alloy ribbon 2 was measured. For measurement, a single sheet tester connected to a B-H analyzer (SY-8218 commercially available from Iwatsu Electric, Co., Ltd.) was used. In the single sheet tester used for measurement, the width of a bobbin into which a sample was inserted was 25 mm, the yoke length was also 25 mm, and in the case of a square sample with a side of 25 mm, by changing the insertion direction of the sample by 90° and measuring the B-H curve in the directions, it was possible to evaluate the magnetic anisotropy of the sample. Here, a square sample with a side of 25 mm was cut out from the amorphous alloy ribbon 2 after the heat treatment, and the B-H curves in the length direction and the width direction of the ribbon were measured. Here, when the square sample was cut out, cutting was performed from near the center of the amorphous alloy ribbon 2 so that one side was parallel to the length direction of the ribbon (therefore, the other side was parallel to the width direction). FIG. 4(*a*) shows the B-H curve in the directions.

Comparative Example 1

On the other hand, results of a conventional method in which an amorphous alloy ribbon that was brought into contact with a heated convex curved surface was transferred while being mechanically constrained, and heated by rapid heating and cooling are shown. Here, in order to stably bring the amorphous alloy ribbon 2 into contact with the convex curved surface, it was necessary to apply tension to the amorphous alloy ribbon 2 and press it against the convex curved surface. Therefore, while applying a tension of 2 [kgf] to the amorphous alloy ribbon 2, the amorphous alloy ribbon 2 that was brought into contact with a heated roller surface was transferred and heated to produce Comparative Example 1, and as in the example, the B-H curves in the length direction and the width direction of the amorphous alloy ribbon were measured. The results are shown in FIG. 4(*b*).

When a heat treatment was performed using a conventional method, as can be understood from FIG. 4(*b*), there was a difference in the B-H curve between the length direction and the width direction, and magnetic anisotropy occurred. On the other hand, according to the present invention, as shown in FIG. 4(*a*), there was no difference in the B-H curve between the length direction and the width direction, and no magnetic anisotropy occurred. Here, all the B-H curves in FIG. 4 were measured under conditions of a frequency of 1 kHz and a maximum magnetic flux density of 1.5 T, but there was no change in the results (that is, the presence of magnetic anisotropy) in FIG. 4 even when the B-H curve was measured while changing the frequency (including DC) and the maximum magnetic flux density.

Example 2

Next, using the second embodiment, without applying tension to the amorphous alloy ribbon 2, while the amorphous alloy ribbon 2 was transferred at a rate of 17 mm/s, both surfaces of the ribbon were heated at 480° C., and thereby Example 2 was produced.

Comparative Example 2

An amorphous alloy ribbon 2 heated by a conventional method was produced as Comparative Example 2. A heat treatment was performed by performing contacting and transferring while a tension of 2 [kgf] was applied to the convex curved surface heated to 490° C.

Figure 5:
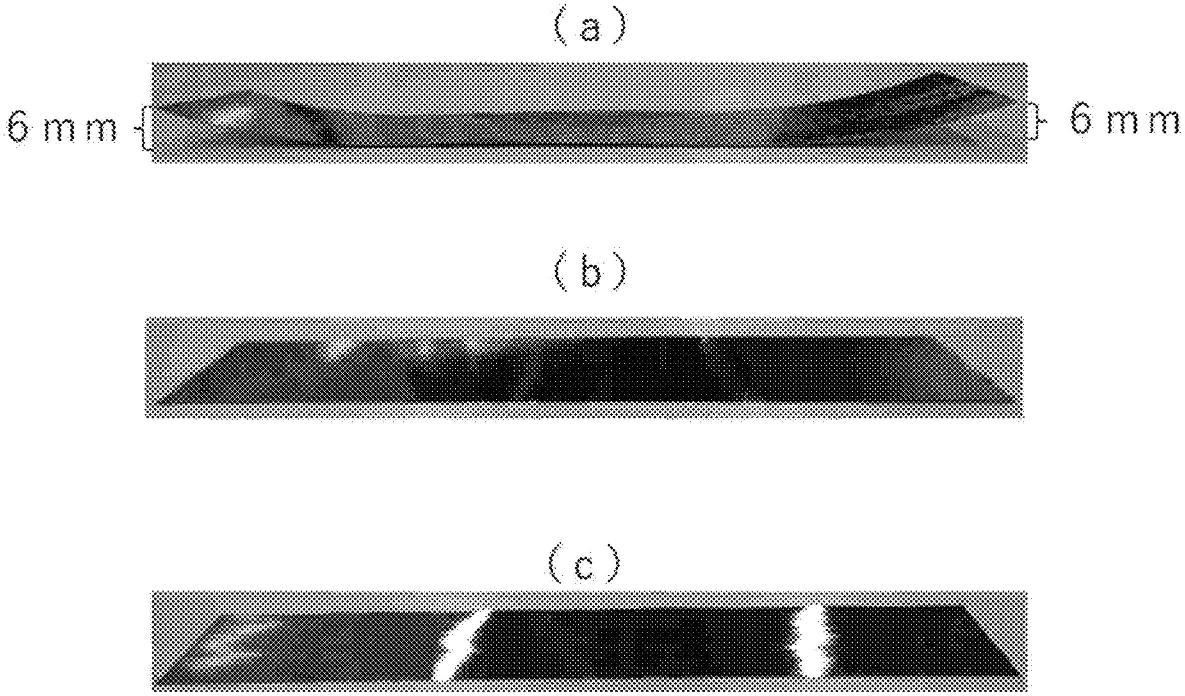
FIG. 5 shows images of amorphous alloy ribbons of Example 2 and Comparative Example 2 in the first embodiment of the present invention.

FIGS. 5(*a*), (*b*), and (*c*) show images of Example 1, Example 2 and Comparative Example 2, respectively. It can be understood that, in Example 1 in FIG. 5(*a*), since the projected surface heat treatment caused bending in the ribbon, both ends of the ribbon were raised by about 6 mm, but in Example 2 in FIG. 5(*b*), bending of the ribbon was corrected, and no raising was observed. On the other hand, it can be understood that, in Comparative Example 2 in FIG. 5(*c*), since a heat treatment was performed while tension was applied to the ribbon, the ribbon did not warp as in Example 2.

Next, B-H curves were measured for Example 2 and Comparative Example 2, which each resulted in a straight ribbon. The results are shown in FIG. 6.

Figure 6:
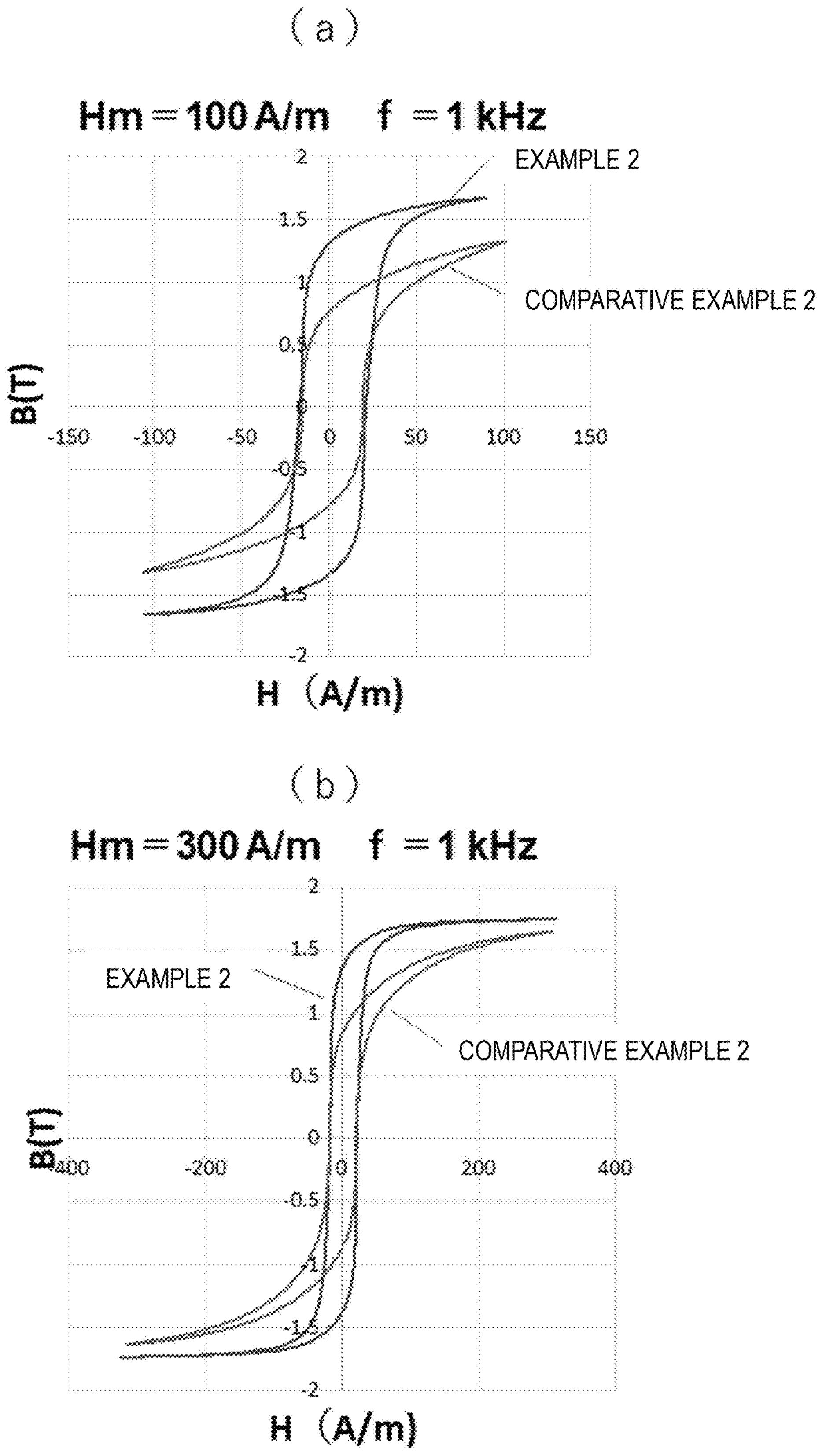
FIG. 6 is a graph showing magnetic characteristics in Example 2 and Comparative Example 2 in the second embodiment of the present invention.

FIG. 6(*a*) shows B-H curves when a magnetic field strength of 100 A/m was applied, and FIG. 6(*b*) shows B-H curves when a magnetic field strength of 300 A/m and a frequency of 1 kHz were applied.

It can be understood from both FIGS. 6(*a*) and (*b*) that Example 2 had a better rise of a B-H loop and better magnetic characteristics than Comparative Example 2.

As described above, according to the embodiments of the present invention, heat could be transferred without applying higher tension than necessary to the amorphous alloy ribbon, and it was possible to produce an amorphous alloy ribbon without causing anisotropy of magnetic characteristics, ribbon breakage and the like. Particularly, when the amorphous alloy ribbon was an Fe-based nanocrystalline alloy, since the temperature tended to rise excessively due to self-heating during crystallization in which nanocrystals were crystallized, it was necessary to release heat to a heating roller or a convex curved surface. In the related art, in order to achieve this, the ribbon was strongly pressed against the heating roller and the convex curved surface by applying strong tension to the ribbon, the contact thermal resistance was reduced, the efficiency of heat dissipation to the heating roller and the convex curved surface increased, and excessive temperature rise was minimized.

According to the embodiments of the present invention, since the band pressed the ribbon, it was possible to reduce the contact thermal resistance without applying excessive tension to the ribbon.

In addition, at both ends of the amorphous alloy ribbon in the width direction, there was often waviness (hereinafter, referred to as side waves) of the ribbon due to the difference in cooling rate during casting, and since this part had poor contact with a heater, the annealing treatment tended to be incomplete, but when the embodiment of the present invention was used, since the heated band pressed the entire ribbon, a sufficient heat treatment was possible even if there were side waves.

Figure 7:
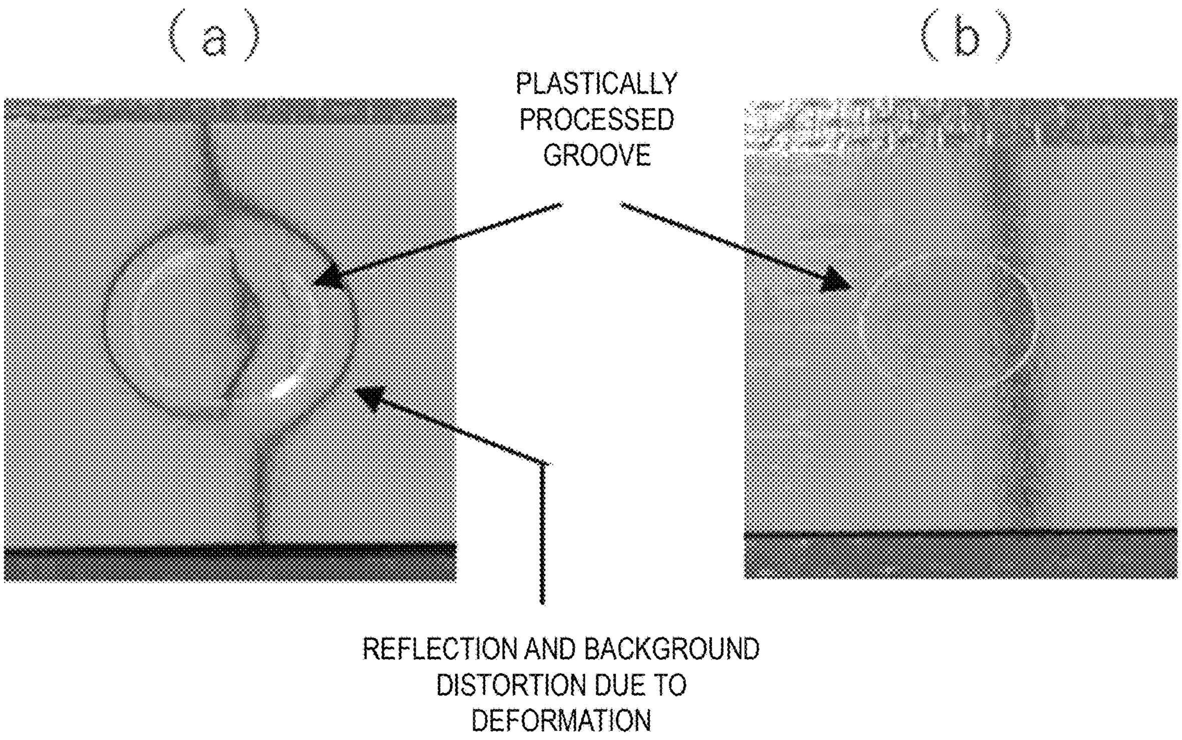
FIG. 7 shows deformation states of an amorphous alloy ribbon before and after a heat treatment in an embodiment of the present invention.

In addition, in the embodiments of the present invention, when the front and back sides of the amorphous alloy ribbon were pressed with the belt and the roller, deformation such as wrinkles and streaks in the amorphous alloy ribbon, which were likely to occur during crystallization of the amorphous alloy ribbon, could be minimized. Here, FIG. 7 shows examples of the deformation state of the amorphous alloy ribbon before and after the heat treatment in the embodiment of the present invention. Specifically, FIG. 7 shows the change before and after the heat treatment in a plastically processed groove formed by pressing an annular stamping punch with a diameter of 9.3 mm on the surface of the amorphous alloy ribbon with a predetermined load. FIG. 7(*a*) shows an image before the heat treatment, and FIG. 7(*b*) shows an image after the heat treatment, and in FIG. 7(*a*), reflection and background distortion due to deformation caused by processing can be observed, and in FIG. 7(*b*), it can be understood that reflection and distortion were eliminated through the heat treatment mechanism according to the embodiment of the present invention.

While the embodiments of the invention have been described above, the present invention is not limited to the above embodiments. It is possible to change the contents in the claims.

REFERENCE SIGNS LIST

1 Heat treatment apparatus
2 Amorphous alloy ribbon
3 Base
4 Ribbon guide slope
5 Brake roller for ribbon tension
6*a*, 6*b*, 6*c* Heating roller
7, 9 Ribbon pressing metal belt
8*a*, 8*b*, 8*c* Thermocouple
10 Guide roller
11 Ribbon width direction regulation mechanism

The invention claimed is:

1. A heat treatment method for an amorphous alloy ribbon, comprising
- a step of transferring an amorphous alloy ribbon while
  - (i) a first surface of the amorphous alloy ribbon is in surface contact with a convex curved surface of a heating roller to heat the amorphous alloy ribbon by heat conduction; and
  - (ii) a second surface opposite to the first surface of the amorphous alloy ribbon is in surface contact with a heated band member to heat the amorphous alloy ribbon by heat conduction;
- wherein the heated band member is a metal band, is bridged over two rollers and driven thereby, and is heated by receiving heat from the two rollers; and
- wherein the transferring is performed while a portion of the amorphous alloy ribbon that is in contact with the convex curved surface is pressed against the convex curved surface from a side opposite to a contact surface via the heated band member.

2. The heat treatment method for an amorphous alloy ribbon according to claim 1, wherein the step is performed a plurality of times by changing the first surface of the amorphous alloy ribbon with which the convex curved surface comes in contact.

3. The heat treatment method for an amorphous alloy ribbon according to claim 1, wherein the amorphous alloy ribbon is an Fe based nanocrystalline soft magnetic material, and the heating roller and the two rollers are each heated to 500° C. or higher.

4. The heat treatment method for an amorphous alloy ribbon according to claim 1, wherein the heated band member forms a surface contact region extending along a circumferential direction of the heating roller.

5. The heat treatment method for an amorphous alloy ribbon according to claim 1, wherein one of the heating roller and the two rollers over which the heated band member is bridged is driven, and others of the heating roller and the two rollers are mechanically dependent.

6. The heat treatment method for an amorphous alloy ribbon according to claim 1, further comprising:

providing, upstream of the heating roller, a ribbon guide slope aligned with a tangent of the heating roller; and introducing the amorphous alloy ribbon while suppressing meandering by the ribbon guide slope and a brake roller.

* * * * *